(12) United States Patent
Chaisson et al.

(10) Patent No.: US 8,284,933 B2
(45) Date of Patent: Oct. 9, 2012

(54) ENCRYPTING VARIABLE-LENGTH PASSWORDS TO YIELD FIXED-LENGTH ENCRYPTED PASSWORDS

(75) Inventors: Terry W. Chaisson, Flossmoor, IL (US); Adam S. Hendrix, Aurora, IL (US); Frederic A. H. Duminy, St. Charles, IL (US)

(73) Assignee: CA, Inc., Islandia, NY (US)

( * ) Notice: Subject to any disclaimer, the term of this patent is extended or adjusted under 35 U.S.C. 154(b) by 730 days.

(21) Appl. No.: 12/407,452

(22) Filed: Mar. 19, 2009

(65) Prior Publication Data

US 2010/0239087 A1    Sep. 23, 2010

(51) Int. Cl.
*H04L 9/00* (2006.01)
(52) U.S. Cl. ............ 380/44; 380/42; 380/278; 380/283; 380/284; 713/168; 713/171; 713/176; 713/186
(58) Field of Classification Search ................ 380/42, 380/278, 283, 284; 713/176, 186, 171, 168
See application file for complete search history.

(56) References Cited

U.S. PATENT DOCUMENTS

| | | | |
|---|---|---|---|
| 7,343,014 B2* | 3/2008 | Sovio et al. ............... | 380/278 |
| 7,552,333 B2* | 6/2009 | Wheeler et al. ............ | 713/176 |
| 2008/0104414 A1* | 5/2008 | Cheng et al. ............... | 713/186 |
| 2008/0112561 A1* | 5/2008 | Kim et al. .................. | 380/42 |

OTHER PUBLICATIONS

Elements of Security: RACF Installation—Student Notes, Document No. GG24-3971, IBM International Technical Support Center, Poughkeepsie, New York, 56 pages, Dec. 1992.
B. Kaliski, "PKCS #5: Password-Based Cryptography Specification Version 2.0," Request for Comments: 2898, http://tools.ietf.org/html/rfc2898, *The Internet Society*, Sep. 2000, 35 pages, Sep. 2000.
K. Raeburn, "Advanced Encryption Standard (AES) Encryption for Kerberos 5," Request for Comments: 3962, http://tools.ietf.org/html/rfc3962, *The Internet Society*, Feb. 2005, 17 pages, Feb. 2005.
JH. Song et al., "The AEX-CMAC Algorithm," Request for Comments: 4493, http://tools.ietf.org/html/rfc4493, *The Internet Society*, Jun. 2006, 21 pages, Jun. 2006.
R. Weiss, The Basics of Security with RACF in z/OS Session RAB1, RAB1 Security for z/OS—The Basics, IBM Software Group, IBM Corporation, 24 pages, Jun. 11, 2007.

* cited by examiner

*Primary Examiner* — Nathan Flynn
*Assistant Examiner* — Phuoc Tran
(74) *Attorney, Agent, or Firm* — Baker Botts L.L.P.

(57) ABSTRACT

According to one embodiment, encrypting passwords includes performing the following for each input password of a plurality of input passwords to yield encrypted passwords, where at least two input passwords have different lengths and the encrypted passwords have the same length. An input password and a random number are received at logic configured to perform a key derivation operation comprising a pseudorandom function. An encryption key is derived from the input password and the random number according to the key derivation operation. The encryption key and a user identifier are received at logic configured to perform a cipher-based message authentication code (CMAC) function. An encrypted password is generated from the encryption key and the user identifier according to the CMAC function.

27 Claims, 1 Drawing Sheet

US 8,284,933 B2

ENCRYPTING VARIABLE-LENGTH PASSWORDS TO YIELD FIXED-LENGTH ENCRYPTED PASSWORDS

TECHNICAL FIELD

The present disclosure relates generally to data encryption, and more specifically to encrypting variable-length passwords to yield fixed-length encrypted passwords.

BACKGROUND

Encryption is the process of transforming information to make the information unreadable to anyone except those possessing an encryption key. The result of the process is encrypted information.

SUMMARY OF EXAMPLE EMBODIMENTS

According to one embodiment, encrypting passwords includes performing the following for each input password of a plurality of input passwords to yield encrypted passwords, where at least two input passwords have different lengths and the encrypted passwords have the same length. An input password and a random number are received at logic configured to perform a key derivation operation comprising a pseudorandom function. An encryption key is derived from the input password and the random number according to the key derivation operation. The encryption key and a user identifier are received at logic configured to perform a cipher-based message authentication code (CMAC) function. An encrypted password is generated from the encryption key and the user identifier according to the CMAC function.

Certain embodiments of the invention may provide one or more technical advantages. A technical advantage of one embodiment may be that encrypted passwords of the same length (fixed-length passwords) may be generated from input passwords of different lengths. Fixed-length passwords may simplify storage space allocation because the total amount of storage space required for the passwords may be readily calculated. Another technical advantage of one embodiment may be that an encryption key is derived from an input password and a random number. Deriving the encryption key from the random number, in addition to the input password, may yield an encryption key that is less susceptible to attack than an encryption key derived from just the input password. Another technical advantage of one embodiment may be that the random number used to derive the encryption key may be recorded. If the input password is received a second time, the same encryption key may be derived again from the recorded random number and the received input password. Since the encryption key can be generated again, it need not be stored and can be deleted after generated.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION

Figure 1:
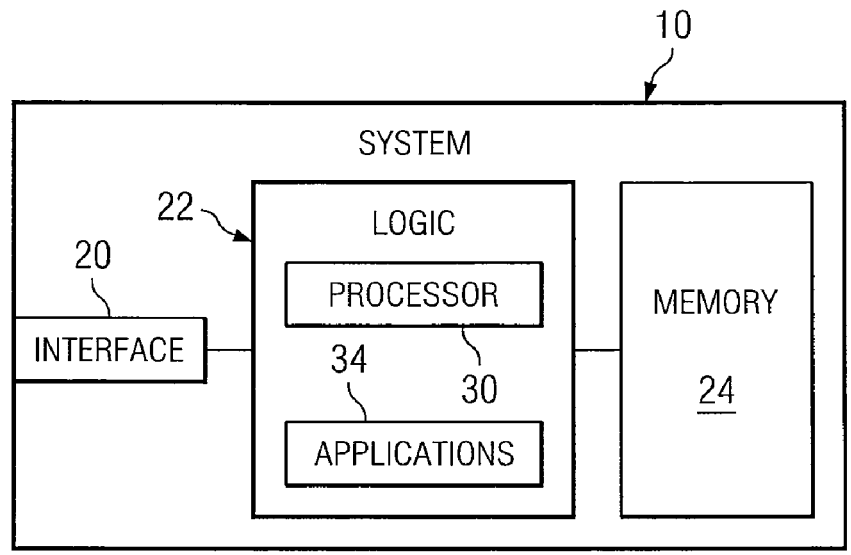
FIG. 1 illustrates an example of a system that may be used to encrypt variable-length passwords to yield fixed-length passwords.
Figure 2:
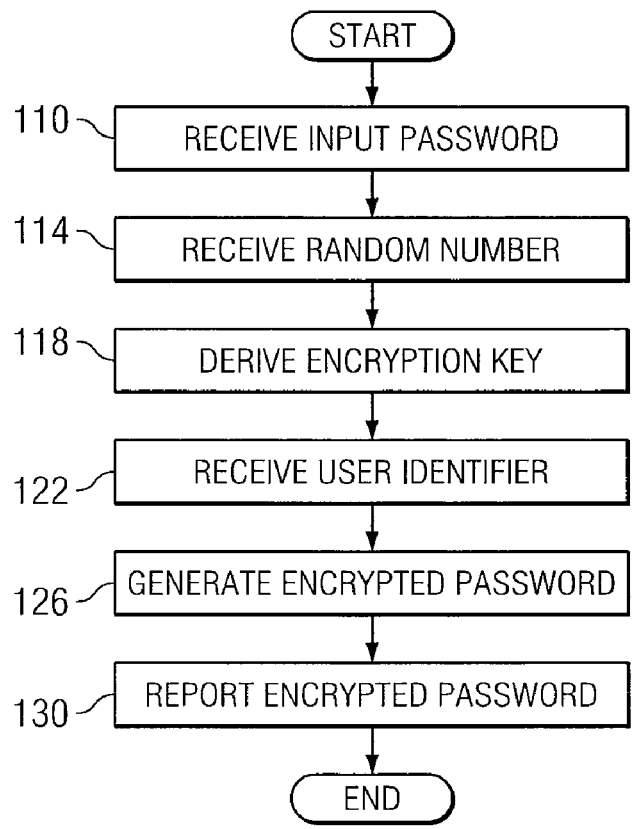
FIG. 2 illustrates an example method for encrypting variable-length passwords to yield fixed-length passwords.

Embodiments of the present invention and its advantages are best understood by referring to FIGS. 1 and 2 of the drawings, like numerals being used for like and corresponding parts of the various drawings.

FIG. 1 illustrates an example of a system 10 that may be used to encrypt variable-length passwords to yield fixed-length encrypted passwords. In certain embodiments, system 10 may encrypt input passwords of different lengths to yield encrypted passwords having the same length. In the embodiments, system 10 may derive an encryption key from an input password and a random number according to a key derivation operation. System 10 may then generate an encrypted password from the encryption key and a user identifier according to a cipher-based message authentication code (CMAC) function.

In certain embodiments, system 10 may encrypt input passwords to yield encrypted passwords in order to provide an added level of security. Input passwords may be used to authenticate and/or authorize a user, but alone may not provide a sufficient level of protection. For example, an input password may be selected by the user and may therefore contain common words, common phrases, and/or repeated characters. This type of input password may be vulnerable to dictionary attacks in which an unauthorized user enters a series of common password combinations to guess the input password by trial and error. Encrypting input passwords may provide more security than user-generated input passwords.

In certain embodiments, system 10 may include an interface 20, logic 22, memory 24, and/or other suitable element. Interface 20 receives input, sends output, processes the input and/or output, and/or performs other suitable operation. In certain embodiments, interface 20 receives an input password, a random number, and/or a user identifier and outputs an encrypted password. Interface 20 may comprise hardware and/or software.

Logic 22 performs the operations of the component, for example, executes instructions to generate output from input. In certain embodiments, logic 22 may derive an encryption key from the input password and the random number according to a key derivation operation that includes a pseudorandom function. Deriving the encryption key from the random number, in addition to the input password, may yield an encryption key that is less susceptible to attack than an encryption key derived from just the input password. Logic 22 may generate an encrypted password from the encryption key and a user identifier according to a cipher-based message authentication code (CMAC) function.

Logic 22 may include hardware (such as a processor 30), software (such as applications 34), and/or other logic. Logic 22 may be encoded in one or more tangible media and may perform operations when executed by a computer. Certain logic 22, such as a processor 30, may manage the operation of a component. Examples of a processor 30 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 24 stores information. Memory 24 may comprise one or more tangible, computer-readable, and/or computer-executable storage medium, and may exclude signals or carrier waves. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of deriving an encryption key and generating an encrypted password may be performed by one component or more than one component. Additionally, operations of system 10 may be performed using any suitable logic comprising software, hardware, and/or other logic. As used in this document, "each" refers to each member of a set or each member of a subset of a set.

FIG. 2 illustrates an example method 100 for encrypting variable-length passwords to yield fixed-length passwords. Method 100 may be performed by system 10 of FIG. 1. Method 100 may start at step 110, where an input password is received. According to some embodiments, the input password may be any suitable password that comprise one or more of any of the following: letters, numbers, symbols, words, or a combination of any of the preceding. In the embodiments, the input password may have any suitable length, and the length of a first input password may differ from that of a second input password. In some embodiments, the input password may be selected by a user or may be generated according to an algorithm.

A random number is received at step 114. The random number may be any suitable random number. For example, the random number may be the time of day that the encryption key is generated. The time of day may be expressed in any suitable manner, such as the eight byte binary representation of the current date and time value generated on a given machine. As another example, the random number may be a number generated according to a random number algorithm such as a hash function.

An encryption key is generated from the input password and the random number according to a key derivation operation at step 118. The key derivation operation may be any suitable function for generating an encryption key. For example, the key derivation operation may be a Password-Based Key Derivation Function (PBKDF) such as PBKDF2. The encryption key may have any suitable length. For example, the length of the encryption key may be a fixed length, such as sixteen bytes, or 128 bits.

The key derivation operation may generate the encryption key in any suitable manner. In certain embodiments, the key derivation operation first receives inputs such as an input password, a random number, and/or an iteration count. In some embodiments, the key derivation operation may use the random number as a salt value to select an encryption key from a set of keys corresponding to the input password.

In some embodiments, the random number may be recorded. If the input password is received a second time, the key derivation operation may be repeated to generate the same encryption key from the recorded random number and the received input password. Since the encryption key can be generated again, it need not be stored and can be deleted after generated.

The key derivation operation applies a pseudorandom function to generate the encryption key. For example, the pseudorandom function may be a Hash Message Authentication Code-Secure Hash Algorithm-1 (HMAC-SHA-1) function. The iteration count may indicate the number of times to iterate the pseudorandom function. Finally, the key derivation operation outputs the encryption key.

A user identifier is received at step 122. The user identifier may identify a user, such as a person, account, entity, or system. An encrypted password is generated from the encryption key and the user identifier according to a cipher-based message authentication code (CMAC) function at step 126. In some embodiments, the length of the encrypted password may be fixed. That is, the length of a first encrypted password generated for a first input password may be the same as the length of a second encrypted password generated for a second input password, even if the length of the first input password is not the same as the length of the second input password.

According to some embodiments, the CMAC function may use the encryption key to encrypt the user identifier to yield an encrypted password comprising a message authentication code (MAC). The CMAC function may be any suitable CMAC function, for example, an Advanced Encryption Standard (AES)-CMAC function.

The CMAC function may generate an encrypted password in any suitable manner. In some embodiments, the CMAC function generates subkeys and then uses the subkeys in a MAC generation algorithm to generate the encrypted password. In the embodiments, a subkey generation algorithm generates a first subkey K1 and a second subkey K2 from the encryption key.

To generate the subkeys, the subkey generation algorithm first determines the value of a variable L. For example, the value of L may be determined using an Advanced Encryption Standard (AES) algorithm, such as an AES-128 algorithm. The AES algorithm may determine the value of L from the encryption key and a zero constant comprising only one or more zeros. For AES-128, the encryption key and the zero constant may be 128 bits long.

The most significant bit of L may be used to determine first subkey K1. If the most significant bit of L is equal to zero, then K1 is the left-shift of L by one bit. Otherwise, K1 is the exclusive-OR of a constant_Rb and the left-shift of L by one bit. For example, the constant_Rb may be 0x00000000000000000000000000000087. The most significant bit of K1 may be used to determine K2. If the most significant bit of K1 is equal to zero, then K2 is the left-shift of K1 by one bit. Otherwise, K2 is the exclusive-OR of the constant_Rb and the left-shift of K1 by one bit.

A MAC generation algorithm may generate the encrypted password from the subkeys K1 and K2 in any suitable manner. In some embodiments, the MAC generation algorithm may be an AES-CMAC algorithm that accepts inputs comprising the encryption key, the user identifier, and the length of the user identifier in octets. In the embodiments, the user identifier may be divided into blocks of a specific block length, such as 128 bits. The last block may be shorter than the specific block length, that is, not a full length block. The number of blocks may be the smallest integer value greater than or equal to the quotient determined by dividing the length of the user identifier by the block length.

The last block may be transformed to make the user identifier the same length as the encryption key. If the last block is a full length block, the value may be calculated by exclusive-OR'ing the contents of the block with K1. If the last block is not a full length block, the value may be calculated by padding the contents up to a full block length and then exclusive-OR'ing the contents of the block with K2. The padding may comprise concatenating the contents of the block with a single '1' followed by a minimum number of '0's to yield a full length block.

A CBC-MAC algorithm generates an encrypted password from the user identifier, the number of blocks, the encryption key, and a variable comprising only one or more zeros. In some embodiments, the encrypted password may have the same length as that of the encryption key. In some embodiments, the encrypted password 170 may be truncated, for example, from sixteen bytes to eight bytes. In some embodiments, the result of truncation is taken in most significant bits first order. The encrypted password is reported at step 130.

Modifications, additions, or omissions may be made to the method without departing from the scope of the invention. The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
performing the following for each input password of a plurality of input passwords to yield a plurality of encrypted passwords, at least two input passwords having different lengths, the encrypted passwords having the same length:
receiving an input password and a random number at logic configured to perform a key derivation operation, the key derivation operation comprising a pseudorandom function;
deriving an encryption key from the input password and the random number according to the key derivation operation;
receiving the encryption key and a user identifier at logic configured to perform a cipher-based message authentication code (CMAC) function; and
generating an encrypted password from the encryption key and the user identifier according to the CMAC function.

2. The method of claim 1, the random number further comprising a time of day when the encryption key is derived.

3. The method of claim 1, further comprising:
padding the user identifier to make a total length of the user identifier equal to a length of the encryption key.

4. The method of claim 1, further comprising:
truncating the encrypted password to yield a truncated encrypted password.

5. The method of claim 1, further comprising:
recording the random number;
receiving the input password a second time; and
generating the encryption key again from the recorded random number and the input password received the second time.

6. The method of claim 1, further comprising:
receiving an iteration count at the logic configured to perform the key derivation operation; and
iterating of the pseudorandom function of the key derivation operation a number of times indicated by the iteration count.

7. The method of claim 1, the CMAC function further comprising an Advanced Encryption Standard (AES)-CMAC function.

8. The method of claim 1, the key derivation operation further comprising a Password-Based Key Derivation Function 2 (PBKDF2).

9. The method of claim 1, the pseudorandom function further comprising a Hash Message Authentication Code-Secure Hash Algorithm-1 (HMAC-SHA1) function.

10. An apparatus comprising:
a memory configured to:
store logic configured to perform a key derivation operation, the key derivation operation comprising a pseudorandom function; and
store logic configured to perform a cipher-based message authentication code (CMAC) function; and
a processor configured to perform the following for each input password of a plurality of input passwords to yield a plurality of encrypted passwords, at least two input passwords having different lengths, the encrypted passwords having the same length:
receive an input password and a random number;
derive an encryption key from the input password and the random number according to the key derivation operation;
receive the encryption key and a user identifier; and
generate an encrypted password from the encryption key and the user identifier according to the CMAC function.

11. The apparatus of claim 10, the random number further comprising a time of day when the encryption key is derived.

12. The apparatus of claim 10, the processor further configured to:
pad the user identifier to make a total length of the user identifier equal to a length of the encryption key.

13. The apparatus of claim 10, the processor further configured to:
truncate the encrypted password to yield a truncated encrypted password.

14. The apparatus of claim 10, the processor further configured to:
record the random number;
receive the input password a second time; and
generate the encryption key again from the recorded random number and the input password received the second time.

15. The apparatus of claim 10, the processor further configured to:
receive an iteration count at the logic configured to perform the key derivation operation; and
iterate of the pseudorandom function of the key derivation operation a number of times indicated by the iteration count.

16. The apparatus of claim 10, the CMAC function further comprising an Advanced Encryption Standard (AES)-CMAC function.

17. The apparatus of claim 10, the key derivation operation further comprising a Password-Based Key Derivation Function 2 (PBKDF2).

18. The apparatus of claim 10, the pseudorandom function further comprising a Hash Message Authentication Code-Secure Hash Algorithm-1 (HMAC-SHA-1) function.

19. A computer-readable medium storing logic when executed by a processor configured to:
perform the following for each input password of a plurality of input passwords to yield a plurality of encrypted passwords, at least two input passwords having different lengths, the encrypted passwords having the same length:
receive an input password and a random number at logic configured to perform a key derivation operation, the key derivation operation comprising a pseudorandom function;
derive an encryption key from the input password and the random number according to the key derivation operation;
receive the encryption key and a user identifier at logic configured to perform a cipher-based message authentication code (CMAC) function; and
generate an encrypted password from the encryption key and the user identifier according to the CMAC function.

20. The computer-readable medium of claim 19, the random number further comprising a time of day when the encryption key is derived.

21. The computer-readable medium of claim 19, the logic further configured to:
pad the user identifier to make a total length of the user identifier equal to a length of the encryption key.

22. The computer-readable medium of claim 19, the logic further configured to:
truncate the encrypted password to yield a truncated encrypted password.

23. The computer-readable medium of claim 19, the logic further configured to:
record the random number;
receive the input password a second time; and
generate the encryption key again from the recorded random number and the input password received the second time.

24. The computer-readable medium of claim 19, the logic further configured to:
receive an iteration count at the logic configured to perform the key derivation operation; and
iterate of the pseudorandom function of the key derivation operation a number of times indicated by the iteration count.

25. The computer-readable medium of claim 19, the CMAC function further comprising an Advanced Encryption Standard (AES)-CMAC function.

26. The computer-readable medium of claim 19, the key derivation operation further comprising a Password-Based Key Derivation Function 2 (PBKDF2).

27. The computer-readable medium of claim 19, the pseudorandom function further comprising a Hash Message Authentication Code-Secure Hash Algorithm-1 (HMAC-SHA-1) function.

* * * * *